(12) United States Patent
Baeza-Yates et al.

(10) Patent No.: US 11,436,235 B2
(45) Date of Patent: Sep. 6, 2022

(54) PIPELINE FOR DOCUMENT SCORING

(71) Applicant: NTENT, Vienna, VA (US)

(72) Inventors: Ricardo Baeza-Yates, Palo Alto, CA (US); Berkant Baria Cambazoglu, Melbourne (AU); Darshan Mallenahalli Shankaralingappa, Berlin (DE); Matteo Catena, Barcelona (ES)

(73) Assignee: NTENT, Vienna, VA (US)

( * ) Notice: Subject to any disclaimer, the term of this patent is extended or adjusted under 35 U.S.C. 154(b) by 525 days.

(21) Appl. No.: 16/578,780

(22) Filed: Sep. 23, 2019

(65) Prior Publication Data

US 2021/0089543 A1    Mar. 25, 2021

(51) Int. Cl.
| | |
|---|---|
| *G06F 16/2457* | (2019.01) |
| *G06F 16/93* | (2019.01) |
| *G06N 20/00* | (2019.01) |
| *G06F 16/248* | (2019.01) |
| *G06F 7/14* | (2006.01) |
| *G06F 16/22* | (2019.01) |

(52) U.S. Cl.
CPC .......... *G06F 16/24578* (2019.01); *G06F 7/14* (2013.01); *G06F 16/22* (2019.01); *G06F 16/248* (2019.01); *G06F 16/93* (2019.01); *G06N 20/00* (2019.01)

(58) Field of Classification Search
CPC .... G06F 16/24578; G06F 16/22; G06F 16/93; G06F 16/248; G06F 7/14; G06N 20/00
USPC .......................................................... 707/728
See application file for complete search history.

(56) References Cited

U.S. PATENT DOCUMENTS

| | | | |
|---|---|---|---|
| 7,197,497 B2 * | 3/2007 | Cossock | G06F 16/951 |
| 2008/0104113 A1 * | 5/2008 | Wong | G06F 16/9535 |
| 2009/0248668 A1 * | 10/2009 | Zheng | G06F 16/334 |
| | | | 707/999.005 |
| 2012/0143792 A1 * | 6/2012 | Wang | G06F 16/9535 |
| | | | 707/E17.108 |
| 2020/0125639 A1 * | 4/2020 | Doyle | G06F 40/30 |
| 2020/0126533 A1 * | 4/2020 | Doyle | G10L 15/1815 |

* cited by examiner

*Primary Examiner* — Hosain T Alam
*Assistant Examiner* — Saba Ahmed
(74) *Attorney, Agent, or Firm* — Cooper Legal Group LLC

(57) ABSTRACT

One or more techniques and/or systems are provided for implementing a pipeline used to generate, train, test, and implement a document scoring model for assigning document scores to documents. Features from various sources are combined to create a joined page level feature set, a joined domain level feature set, and a host level feature set. Numerical features and content features are extracted from ground truth documents and random documents. The numerical features are joined with the joined feature sets to create a set of joined features. The document scoring model is trained using the set of joined features and a training technique. A document is scored with a document score using the document scoring model based upon the content features and the set of joined features with document scores obtained during training.

20 Claims, 6 Drawing Sheets

PIPELINE FOR DOCUMENT SCORING

BACKGROUND

An extract, transform, and load pipeline ("ELT pipeline") can be used for various purposes where data is extracted from a source, transformed into a different context/representation, and is loaded into a destination. Data may be extracted from homogeneous or heterogeneous sources. The data may be transformed into a storage format/structure that can be used for certain purposes, such as for querying and analyzing the data. The data may then be loaded into a destination as an output of the ELT pipeline. In this way, the ETL pipeline extracts data from various sources, enforces any consistency standards, conforms the data so that portions of the data from the various sources can be used together, and outputs the data in a format that can be consumed by various applications and/or end users, such as where an indexing service indexes documents that can then be provided to a user as search results. Unfortunately, the indexing service may index all available documents, which wastes a significant amount of resources and can be very time consuming. Indexing all available documents can be problematic when the indexing service is hosted within a limited resource environment.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for a pipeline that trains a document scoring model to score documents are provided herein. It may be appreciated that a document may comprise any type of content, such as a web pages, files, text documents, images, and/or any other type of data/content. Unlike conventional indexing services/techniques that do not selectively index certain documents but instead index all available documents, the disclosed pipeline has a static ranking (query independent) that is a proxy of the intrinsic relevance of each document. Accordingly, merely select documents from all available documents could be selected for further processing such as indexing. Indexing only selected documents (e.g., the best documents) improves the functionality of indexing services that would otherwise waste computing resources and time indexing all documents. Thus, the speed of indexing is greatly improved because only certain documents (e.g., higher quality documents) are indexed.

The pipeline comprises a feature combiner configured to obtain features from one or more levels of feature sets. For example, the feature combiner is configured to acquire page level features from various sources. It may be appreciated that a page level feature is associated with a page, and that a page, as used herein, may refer to a name or any way to address/reference a single document (a single piece of content without considering external information such as information from hosts and a domain), and is not limited to merely web pages but any way to address/reference any type of document/content. A page level feature may correspond to a feature of a document (e.g., a web page, a text document, a .pdf document, or any other type of content). The feature combiner is configured to acquire host level features from various sources. A host level feature may correspond to features of a host of a document (e.g., feature of a hosting service that hosts websites and/or domains). The feature combiner is configured to acquire domain level features from various sources. A domain level feature may correspond to features of a domain associated with a document (e.g., a domain/address of a website).

The feature combiner combines the page level features (e.g., page level files) into a single joined page level feature set (e.g., a single file, table, or data structure within a page level feature folder). The feature combiner combines the domain level features (e.g., domain level files) into a single joined domain level feature set (e.g., a single file, table, or data structure within a domain level feature folder). The feature combiner combines the host level features (e.g., host level files) into a single joined host level feature set (e.g., a single file, table, or data structure within a host level feature folder). The joined page level feature set, the joined domain level feature set, and the joined host level feature set are outputted for production (e.g., to use in indexing documents, ranking search results, etc.) and are outputted to a ground truth creator for further training of the document scoring model.

It may be appreciated that any number and/or combination of levels of features can be used, such as a single level (e.g., only page level features), two levels (e.g., domain level features and page level features), three levels (e.g., page level features, host level features, and domain level features), or any other number of levels (e.g., additional levels of features may be considered and/or added such as for a total of 5 levels of features or any other number of levels of features). In an example where a single level of features is available, the single level of features may comprise multiple types of features, such as where merely the page level features are available and comprise measures like the HTML percentage, number of tokens, and/or others. In this way, any number and/or combination of levels of features can be used.

A feature extractor extracts numerical features and/or content features from ground truth documents and/or random documents. The random documents are used in order to mitigate overfitting during training of the document scoring model. A numerical feature may correspond to a numeric feature or statistic of HTML of a document such as a ratio of HTML content to non-HTML content, a numeric feature related to a number of websites linking to the document, etc. The content features may correspond to textual features of the document.

The ground truth creator joins the numerical features of the ground truth documents and the random documents with the joined page level feature set, the joined domain level feature set, and the joined host level feature set to create a set of joined features. A trainer is configured to generate, train, and test the document scoring model based upon the set of joined features using a training technique, such as a gradient boosted decision tree regression technique or any other machine learning technique that can be used to train a model. The trainer outputs a class file (e.g., representing the document scoring model) that is outputted to production for indexing documents, ranking search results, scoring the quality and/or relevancy of documents, etc.

An injector uses the content features extracted by the feature extractor and the document scoring model such as the set of joined features with scores assigned by the document scoring model to assign document scores to documents. In this way, a document scoring model is built, trained, and outputted by the pipeline to production. The document scoring model is used to assign document scores to documents that are indicative of the quality of a document, a relevancy of the document, an importance of the document, etc. The document scores can be used for a variety of purposes, such as ranking and ordering search results, determining whether to index a document, and/or other purposes.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
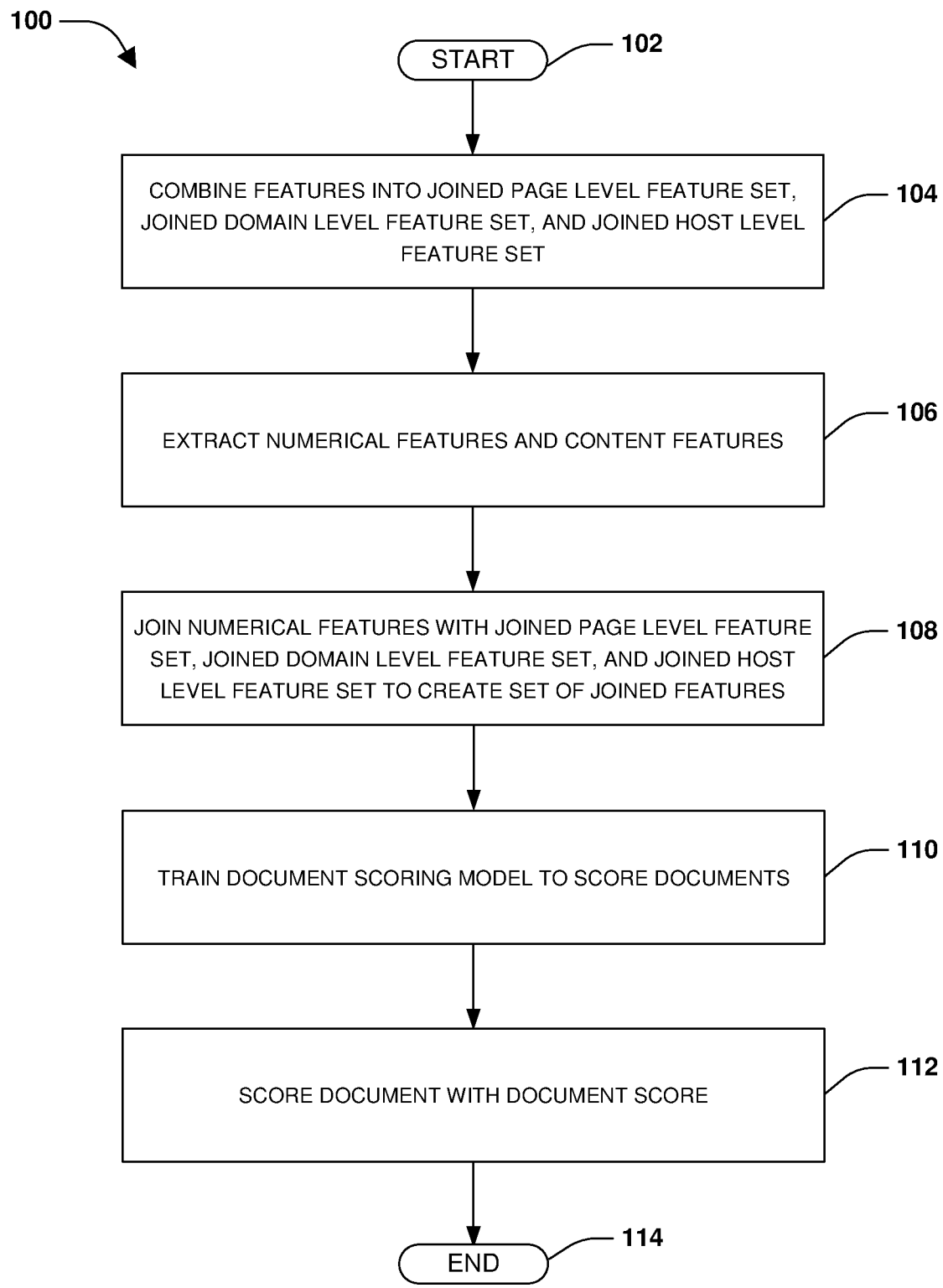
FIG. 1 is a flow diagram illustrating an exemplary method of document scoring.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for a pipeline that trains and outputs a document scoring model, such as a machine learning model, are provided herein. The pipeline creates a micro-service using the document scoring model to make predictions online, which is query-independent and can take into account a substantial amount of features (e.g., hundreds of features from various disparate sources). The predictions may relate to a quality of a document that can be used to determine whether to index the document or not. The predictions may relate to how relevant a document is to a query, and thus may be used to rank search results for the query. It may be appreciated that the document scoring model may be used for a wide variety of purposes beyond the examples described herein.

Figure 2:
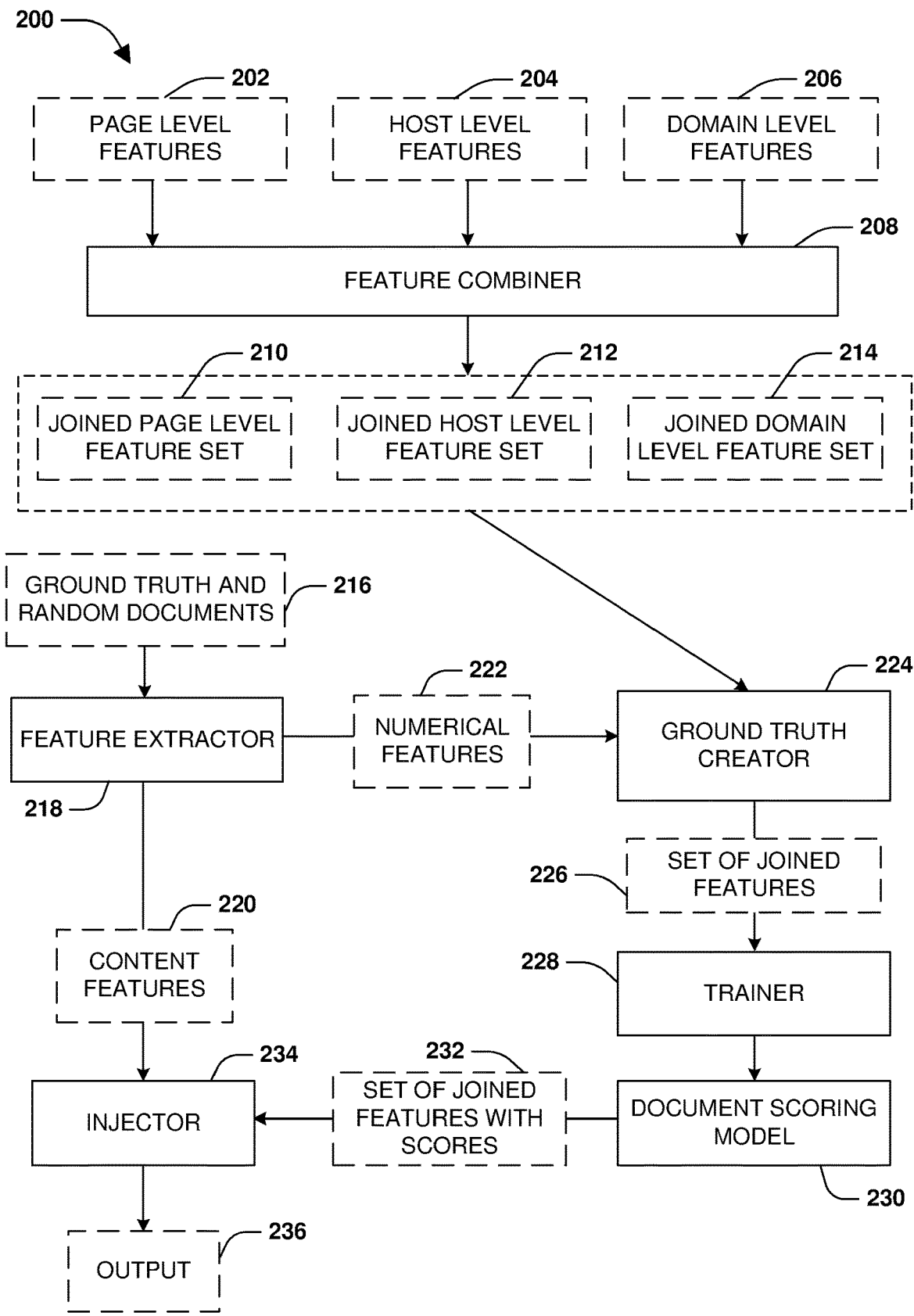
FIG. 2 is a component block diagram illustrating an exemplary system for a pipeline that generates and trains a document scoring model for assigning document scores to documents.

An embodiment of a pipeline that trains and outputs a document scoring model for scoring documents (e.g., webpages, files, text documents, .pdf documents, images, or any other type of data/content) is illustrated by an exemplary method 100 of FIG. 1, which is described in conjunction with system 200 of FIG. 2. At 102, the method starts. The pipeline for training the document scoring model 230 may comprise various components, such as a feature combiner 208, a feature extractor 218, a ground truth creator 224, a trainer 228, an injector 234, and/or other components (e.g., software executable by a computer, hardware of the computer, etc.), as illustrated by FIG. 2. The pipeline may retrieve various types of features from different types of sources, such as different websites, webpages, domains (e.g., an address of a web hosting service), hosts (e.g., the web hosting service), and/or other types of services and content. For example, the pipeline may acquire page level features 202 from various webpages or other types of documents (e.g., a text document, a .pdf document, etc.). The pipeline may acquire host level features 204 from various hosts such as from different web hosting services. The pipeline may acquire domain level features 206 from various domains.

At 104, the feature combiner 208 combines the page level features 202 from the different sources to create a joined page level feature set 210. For example, the page level features 202 may be initially stored within different page level files within a page level folder. The feature combiner 208 combines the page level features 202 within the different page level files into a single data structure (e.g., a single file, table, etc.) to create the joined page level feature set 210 within the page level folder.

The feature combiner 208 combines the host level features 204 from the different sources to create a joined host level feature set 212. For example, the host level features 204 may be initially stored within different host level files within a host level folder. The feature combiner 208 combines the host level features 204 within the different host level files into a single data structure (e.g., a single file, table, etc.) to create the joined host level feature set 212 within the host level folder.

The feature combiner 208 combines the domain level features 206 from the different sources to create a joined domain level feature set 214. For example, the domain level features 206 may be initially stored within different domain level files within a domain level folder. The feature combiner 208 combines the domain level features 206 within the different domain level files into a single data structure (e.g., a single file, table, etc.) to create the joined domain level feature set 214 within the domain level folder.

The feature combiner 208 may output the joined page level feature set 210, the joined host level feature set 212, and/or the joined domain level feature set 214 to production for use by the document scoring model 230, once trained, for scoring documents for various purposes such as for ranking search results of documents, determining whether certain documents should be indexed or not, etc. The feature combiner 208 may output the joined page level feature set 210, the joined host level feature set 212, and/or the joined domain level feature set 214 to the ground truth creator 224 of the pipeline for further use in training the document scoring model 230.

At 106, the feature extractor 218 extracts numerical features 222 and/or content features 220 from documents 216, such as ground truth documents and/or random documents. The ground truth documents may correspond to documents with known/labeled categories and/or features. The random documents may be used to avoid overfitting during training of the document scoring model 230.

The content features 220 may correspond to textual features of a document (e.g., keywords extracted from a webpage, which may be used to identify a topic, categories, entity, or other information associated with the document).

The numerical features 222 may correspond to various types of numerical statistics of a document, such as numeric HTML information. In an example, a numerical feature corresponds to a number of times a document is linked to by a website. In another example, a numerical feature corresponds to a ratio of an amount of a first type of data (e.g., HTML data) to an amount of a second type of content (e.g., non-HTML data) within a document. It may be appreciated that a variety of different types of features may be extracted from the ground truth documents and/or the random documents. The feature extractor 218 outputs the numerical features 222 to the ground truth creator 224 of the pipeline for further training the document scoring model 230. The feature extractor 218 outputs the content features 220 to the injector 234 for used by the document scoring model 230 for scoring documents.

At 108, the ground truth creator 224 joins the numerical features 222 with the joined page level feature set 210, the joined host level feature set 212, and/or the joined domain level feature set 214 to create a set of joined features 226 for the ground truth documents and/or the random documents. The ground truth creator 224 outputs the set of joined features 226 for the ground truth documents and/or the random documents to the trainer 228 for further training the document scoring model 230.

At 110, the trainer 228 trains the document scoring model 230 to score documents. The trainer 228 utilizes one or more training techniques and the set of joined features 226 to train the document scoring model 230. The trainer 228 may utilize any type of machine learning algorithm, such as a gradient boosted decision tree regression technique, for training the document scoring model 230. Once trained, the document scoring model 230 is made available for production for scoring documents for various purposes such as for ranking search results of documents, indexing documents, etc. The set of joined features with document scores 232 outputted by the document scoring model 230 during training may be output to the injector 234.

At 112, the injector 234 may utilizes the content features 220 and/or the set of joined features with document scores 232 with the document scoring model 230 to produce an output 236, such as to assign a document score to a document for the purpose of ranking search results, determining whether to index the document, etc. In this way, the numerical features 222 may be merged with the content features 220 for scoring the document using the document scoring model 230. In an example, a document score may correspond to an importance of a document, such as how important the document may be to a user or application. In another example, the document score may correspond to a quality of a document, such as the quality of content of a webpage (e.g., how accurate and information rich is a webpage). In another example, the document score may correspond to a relevancy of a document, such as how relevant the document is to a query. Thus, the document score may be used to rank documents within search results, and the ranks may be used to order how the search results are displayed to a user or provided to an application. At 114, the method ends.

Figure 3:
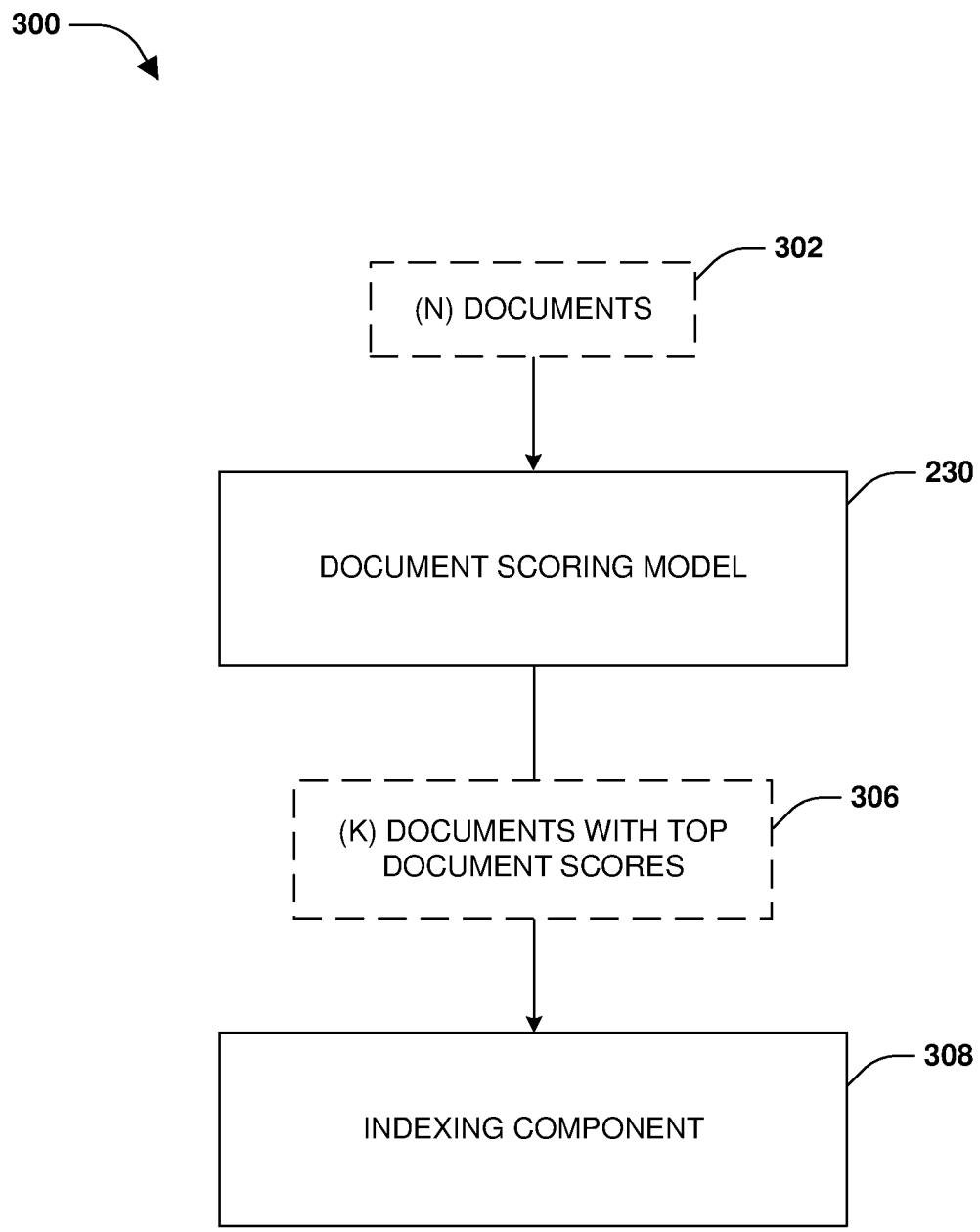
FIG. 3 is a component block diagram illustrating an exemplary system for scoring documents in order to determine whether to selectively index certain documents or not.

FIG. 3 illustrates a system 300 that utilizes the document scoring model 230 for determining whether to index documents 302. The system 300 improves upon existing indexing techniques because merely select documents from the documents 302 are indexed based upon the select documents being assign document scores above a threshold or having top (e.g., largest) document scores. For example, there may be N documents 302 (e.g., 1 million documents). The document scoring model 230 assigns document scores to the N documents 302. Merely K documents (e.g., 100,000 documents having the top document scores) are provided to the indexing component 308. Thus, the speed and resource consumption for indexing by the indexing component 308 is improved ten times because just 100,000 documents are being indexed as opposed to 1 million documents.

In an example, the documents 302 may correspond to webpages being crawled for the purpose of indexing the webpages for further use by a search engine. As the documents 302 are crawled, the documents 302 are input into the document scoring model 230 that was created and trained by the pipeline, as previously described in relation to FIGS. 1 and 2. The document scoring model 230 may extract features of a document. The document scoring model 230 may append external features to the extracted features. The external features may correspond to the joined page level feature set 210, the joined host level feature set 212, the joined domain level feature set 214, and/or other features identified by the pipeline. The document scoring model 230 may utilize the extracted features and/or the appended external features to assign a document score to the document. In this way, the document scoring model 230 may assign document scores 306 to the documents.

The document scoring model 230 may input the document scores 306 into an indexing component 308. The indexing component 308 may utilize thresholding or other techniques for determining whether certain documents should be indexed or not. For example, the indexing component 308 may index a first document based upon the first document having a document score above a threshold. The indexing component 308 may refrain from indexing a second document based upon the second document having a document score below the threshold. In this way, certain documents may be selectively indexed based upon document scores indicative of the quality, importance, and/or relevancy of such documents.

Figure 4:
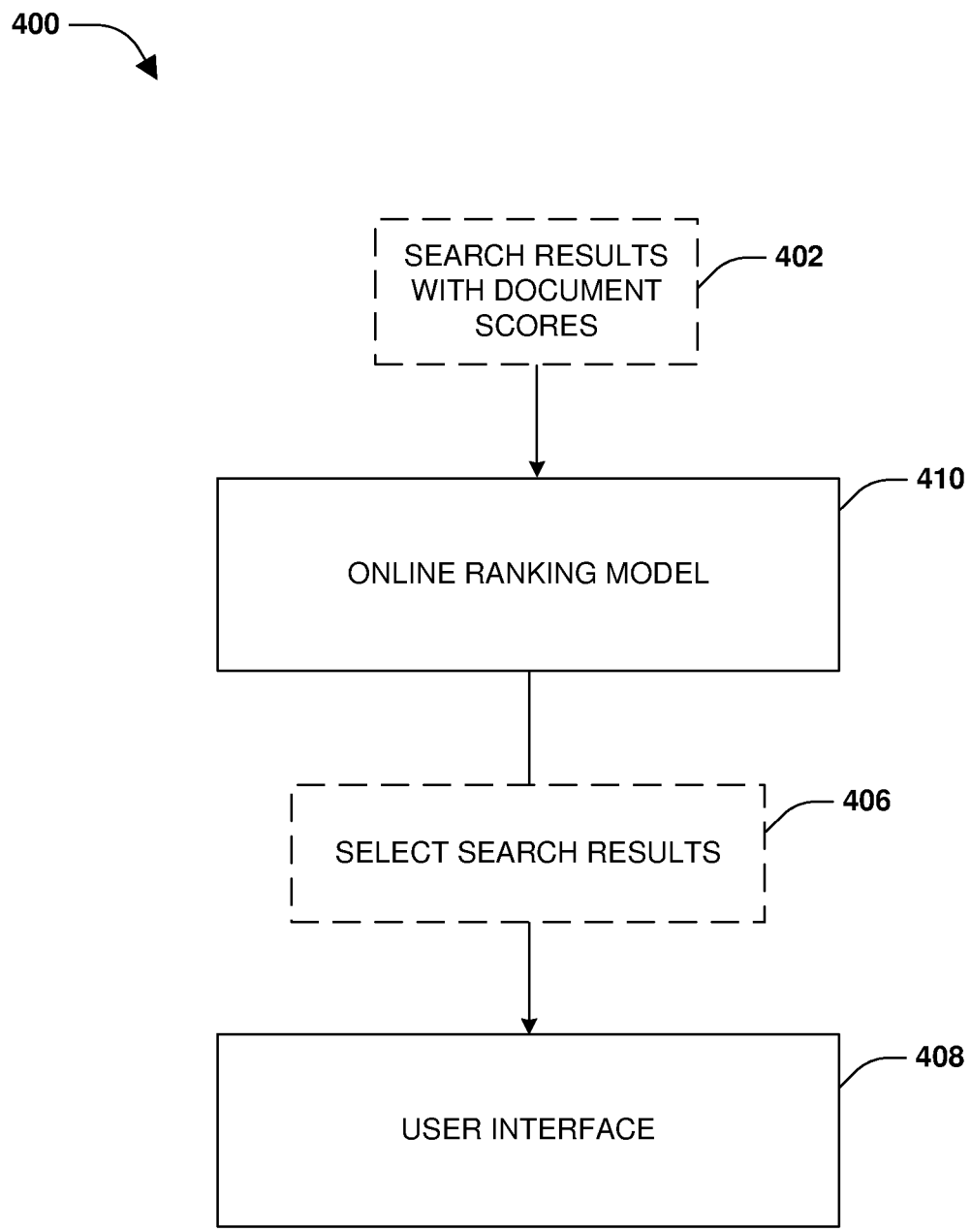
FIG. 4 is a component block diagram illustrating an exemplary system for scoring documents in order to rank search results.

FIG. 4 illustrates a system 400 that utilizes document scores as dynamic input from the document scoring model 230 for ranking search results 402. In an example, a user or an application may submit a query for documents (e.g., files, webpages, text documents, or other types of data) relevant to the query. Accordingly, an online ranking model 410 may obtain search results 402 of documents that correspond to the query. Document scores assigned to the search results 402 by the document scoring model 230 may be input into the online ranking model 410.

The online ranking model 410 may extract features of a document within the search results 402 and/or features of the query. The document scoring model 230 may append external features to the extracted features and/or the features of the query. The document scoring model 230 may utilize the extracted features, the features of the query, the document scores, and/or the appended external features to rank the search results 402. For example, the document scores of the documents within the search results 402 may be used to rank the search results 402 to create ranked search results. In an example, the ranks of the search results 402 may be used to determine what select search results 406 to display and/or how to order the select search results 406 for display to a user through a user interface 408, such as through a search result interface. Search results with higher ranks may be displayed more prominently than search results with lower ranks. In another example, the ranks are used to determine an order with which to provide the search results back to an application that submitted the query. In this way, the document scores assigned by the document scoring model 230 are used as dynamic input by the online ranking model 410 for determining what search results to provide for a given query.

Figure 5:
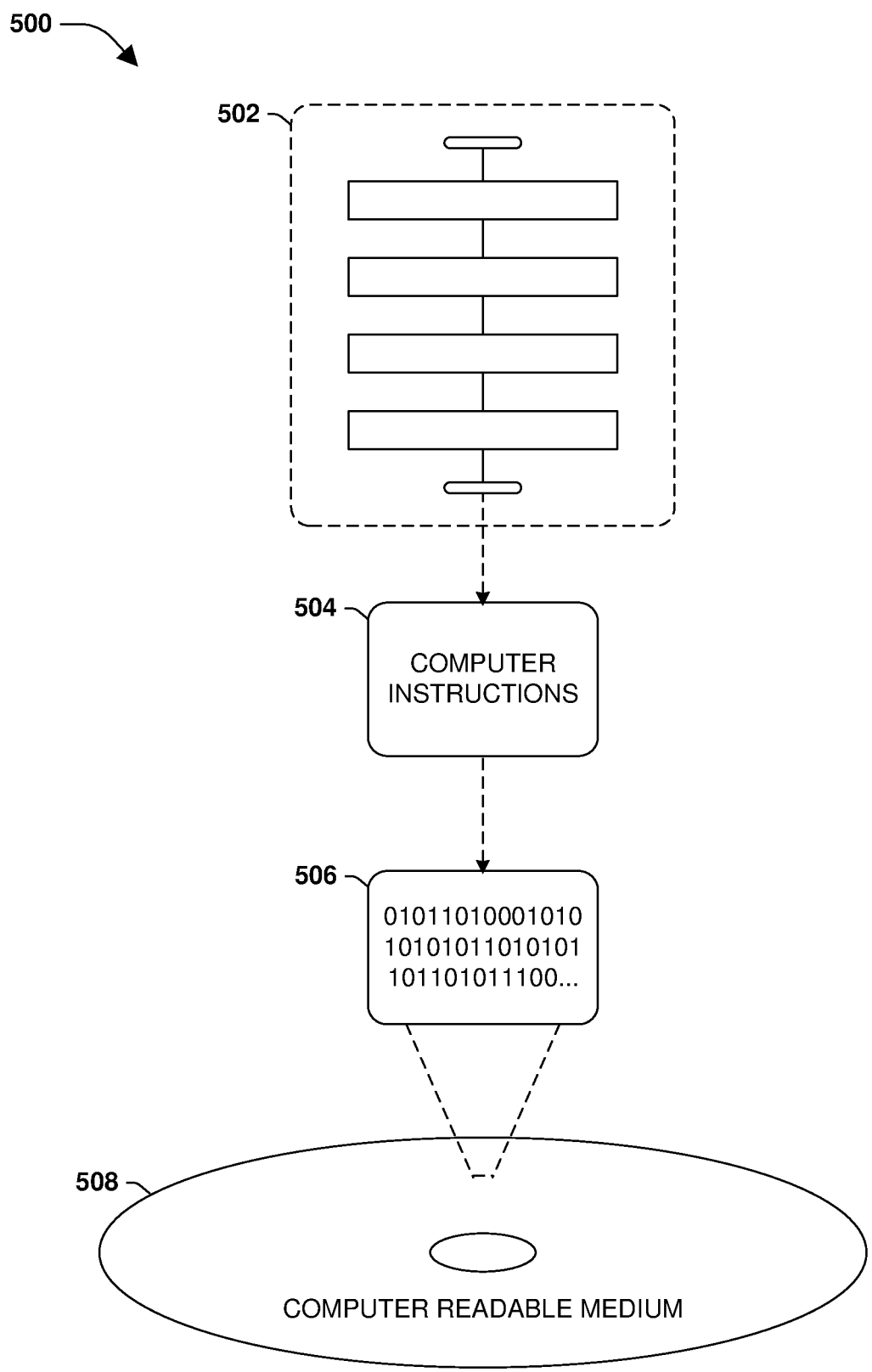
FIG. 5 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 100 of FIG. 1, for example. In some embodiments, the processor-executable instructions 504 are configured to implement a system, such as at least some of the exemplary system 200 of FIG. 2, at least some of the exemplary system 300 of FIG. 3, and/or at least some of the exemplary system 400 of FIG. 4, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
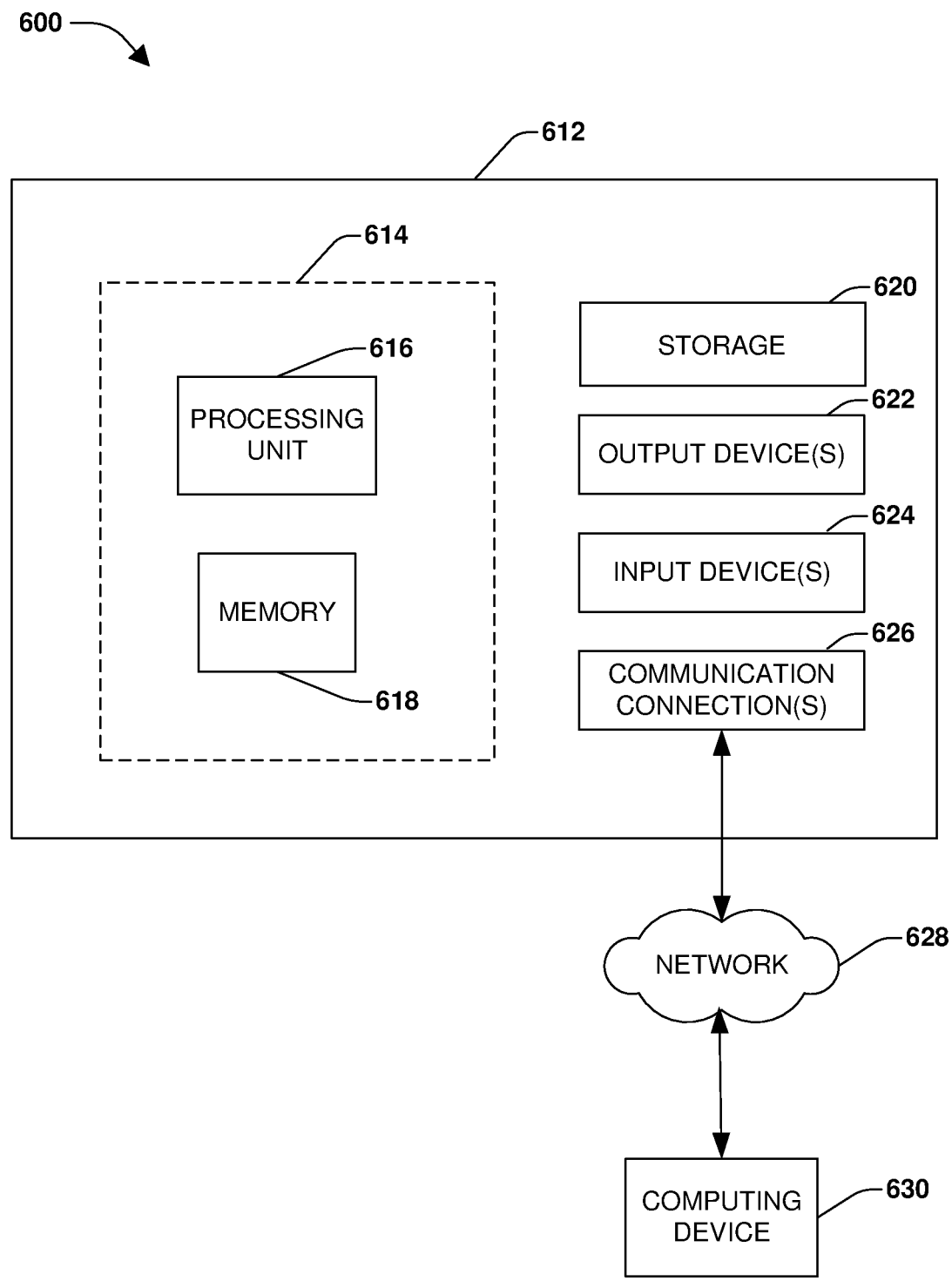
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Computer storage media does not, however, include propagated signals. Rather, computer storage media excludes propagated signals. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   combining feature types within one or more levels of feature sets into a joined host level feature set, wherein the one or more levels of feature sets comprise page level features joined into a joined page level feature set, domain level features joined into a joined domain level feature set, and host level features joined into a joined host level feature set, wherein a domain level feature corresponds to a feature of a domain associated with a target document, and wherein a host level feature corresponds to a feature of a host associated with a target document;
   extracting numerical features and content features from ground truth documents and random documents, wherein a numerical feature corresponds to a ratio of an amount of a first type of content within a target document to an amount of a second type of content within the target document;
   joining the numerical features with the one or more levels of feature sets to create a set of joined features for the ground truth documents and the random documents;
   training a document scoring model utilizing machine learning to score documents using the set of joined features;
   scoring documents with document scores using the document scoring model based upon the content features and the set of joined features with document scores obtained during training; and
   selectively indexing a subset of the documents based upon the document scores of the documents.

2. The method of claim 1, wherein a set of search results for a query comprises a document, and the method comprising:

assigning a rank to a document within the set of search results based upon a document score assigned to the document.

3. The method of claim 2, comprising:
displaying the set of search results in response to receiving the query, wherein a document is populated within the set of search results based upon the rank.

4. The method of claim 1, comprising:
indexing a document based upon a document score exceeding a threshold.

5. The method of claim 1, comprising:
refraining from indexing a document based upon a document score not exceeding a threshold.

6. The method of claim 1, wherein the document score is indicative of an importance of the document.

7. The method of claim 1, wherein the document score is indicative of at least one of an importance or quality of the document.

8. The method of claim 1, wherein the document score is indicative of a relevancy of the document.

9. The method of claim 1, wherein a numerical feature corresponds to a numerical statistic of a target document.

10. The method of claim 1, wherein a document comprises a webpage.

11. The method of claim 1, wherein a document comprises a text document.

12. The method of claim 1, wherein a numerical feature corresponds to a number of times a target document is linked to.

13. The method of claim 1, wherein the document score is indicative of a quality of the document.

14. The method of claim 2, comprising displaying the set of search results.

15. The method of claim 1, wherein the machine learning comprises a gradient boosted decision tree regression technique.

16. The method of claim 1, comprising:
merging the numerical features with the content features for scoring a document using the document scoring model.

17. The method of claim 1, wherein the document score is indicative of an importance and a quality of the document.

18. The method of claim 1, wherein the content features comprise textual features of a target document.

19. A non-transitory machine readable medium comprising instructions for performing a method, which when executed by a machine, causes the machine to:
combine feature types within one or more levels of feature sets into a joined host level feature set, wherein the one or more levels of feature sets comprise page level features joined into a joined page level feature set, domain level features joined into a joined domain level feature set, and host level features joined into a joined host level feature set, wherein a domain level feature corresponds to a feature of a domain associated with a target document, and wherein a host level feature corresponds to a feature of a host associated with a target document;
extract numerical features and content features from ground truth documents and random documents, wherein a numerical feature corresponds to a ratio of an amount of a first type of content within a target document to an amount of a second type of content within the target document;
join the numerical features with the one or more levels of feature sets to create a set of joined features for the ground truth documents and the random documents;
train a document scoring model utilizing machine learning to score documents using the set of joined features;
score documents with document scores using the document scoring model based upon the content features and the set of joined features with document scores obtained during training; and
selectively index a subset of the documents based upon the document scores of the documents.

20. A computing device comprising:
a memory comprising instructions; and
a processor coupled to the memory, the processor configured to execute the instructions to cause the processor to:
combine feature types within one or more levels of feature sets into a joined host level feature set, wherein the one or more levels of feature sets comprise page level features joined into a joined page level feature set, domain level features joined into a joined domain level feature set, and host level features joined into a joined host level feature set, wherein a domain level feature corresponds to a feature of a domain associated with a target document, and wherein a host level feature corresponds to a feature of a host associated with a target document;
extract numerical features and content features from ground truth documents and random documents, wherein a numerical feature corresponds to a ratio of an amount of a first type of content within a target document to an amount of a second type of content within the target document;
join the numerical features with the one or more levels of feature sets to create a set of joined features for the ground truth documents and the random documents;
train a document scoring model utilizing machine learning to score documents using the set of joined features;
score documents with document scores using the document scoring model based upon the content features and the set of joined features with document scores obtained during training; and
selectively index a subset of the documents based upon the document scores of the documents.

* * * * *